June 13, 1939. W. C. FRY 2,162,481
TRAILER COUPLER
Filed Dec. 22, 1937 2 Sheets-Sheet 1

WITNESSES

INVENTOR
Wilbur C. Fry
BY
ATTORNEYS

June 13, 1939. W. C. FRY 2,162,481
TRAILER COUPLER
Filed Dec. 22, 1937 2 Sheets-Sheet 2
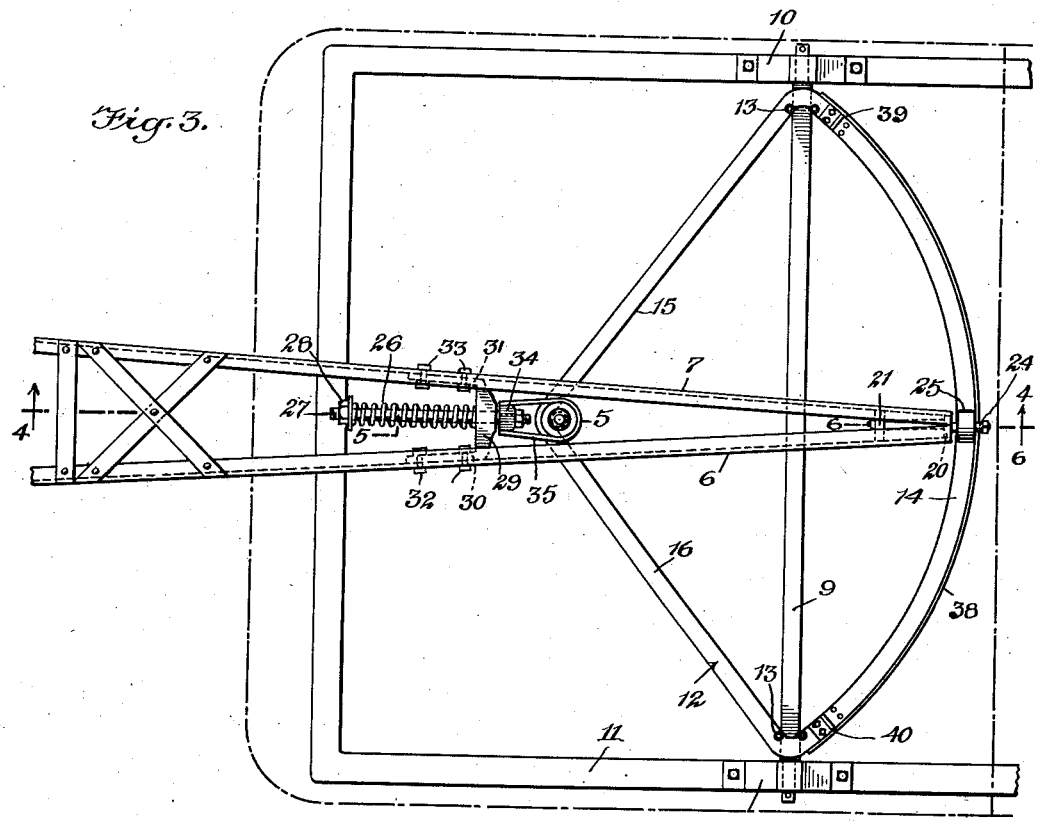
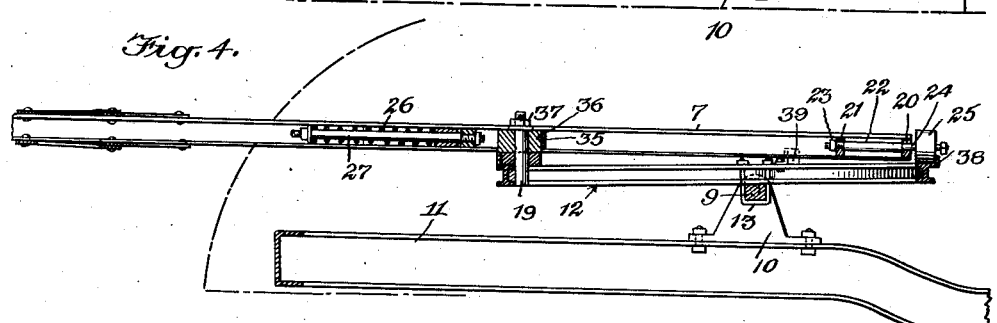
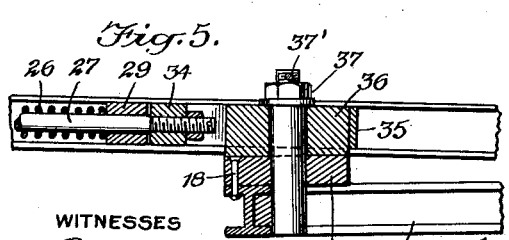
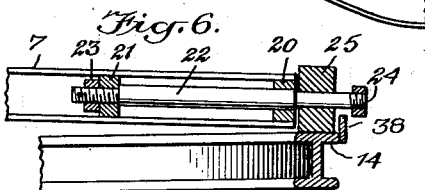
WITNESSES
INVENTOR
Wilbur C. Fry
BY
ATTORNEYS Patented June 13, 1939

2,162,481

UNITED STATES PATENT OFFICE 2,162,481

TRAILER COUPLER

Wilbur C. Fry, New York, N. Y.

Application December 22, 1937, Serial No. 181,065

3 Claims. (Cl. 280—33.44)

This invention relates to trailer couplers for automobiles, and has for an object to provide an improved construction wherein the weight of the front of the trailer is transmitted to the rear of the automobile adjacent the rear axle.

Another object of the invention is to provide a trailer coupler wherein the strain from the coupling structure is communicated throughout the trailer.

A further and more specific object of the invention is to provide a construction wherein the trailer is provided with draw bars having extensions forming part of the coupling means with the articuated parts arranged forwardly of the rear of the automobile pulling the trailer.

In the accompanying drawings—

Fig. 3 is a top plan view of the forward end of the trailer coupling showing various articulated parts, the structure being on an enlarged scale to that shown in Fig. 1;

Fig. 4 is a sectional view through Fig. 3 approximately on the line 4—4;

Fig. 5 is an enlarged fragmentary sectional view through Fig. 3 approximately on the line 5—5;

Fig. 6 is an enlarged fragmentary sectional view through Fig. 3 approximately on the line 6—6.

Figure 1:
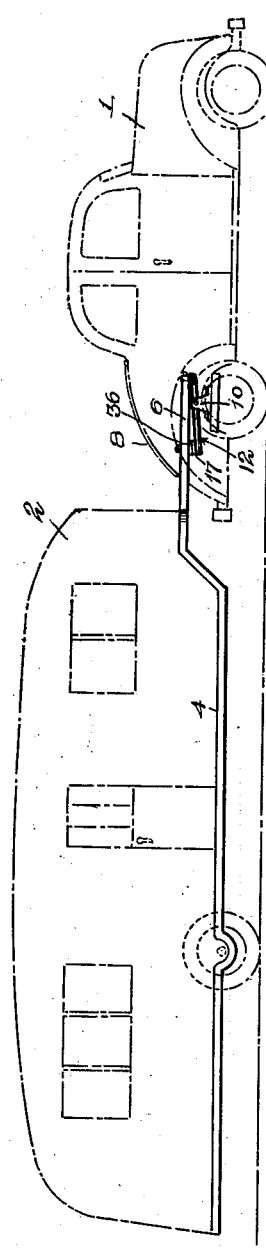
Fig. 1 is a side view of a trailer coupler disclosing an embodiment of the invention, an automobile and trailer being shown in dotted lines in connection therewith.
Figure 2:
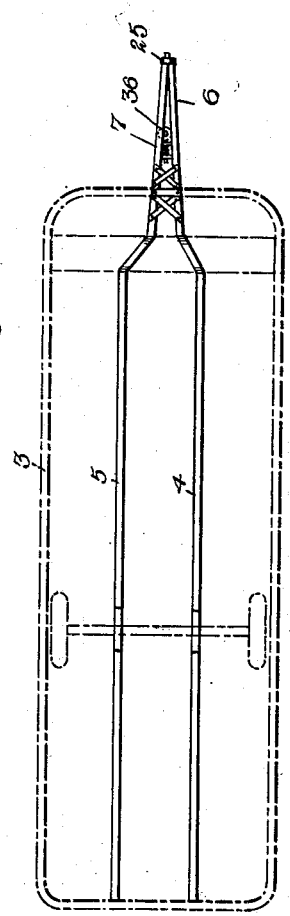
Fig. 2 is a top plan view of that part of the coupler permanently connected with the trailer.

Referring to the accompanying drawings by numerals, 1 indicates an automobile of standard type commonly known as a "coupe", while 2 represents a trailer which may be of any desired type. Connected with the chassis 3 of the trailer 2 are a pair of draw bars 4 and 5, which may be bolted, welded, or otherwise secured to the chassis. Preferably these draw bars extend the full length of the trailer and are connected thereto at different places, as for instance at the rear and at the front. The respective draw bars have draw-bar extensions 6 and 7 which overlap the rear part of the automobile 1, as shown particularly in Fig. 1. The rear cover 8 of the automobile is raised a few inches so as to permit the extensions 6 and 7 to project therebetween. This structure is shown in enlarged plan in Fig. 3, from which it will be seen that the extensions 6 and 7 project an appreciable distance into the automobile. As illustrated in Fig. 3, a journal bar 9 is positioned directly over the axle of the rear wheels of the automobile though it could be placed forwardly of the axle or rearwardly as preferred. However, it is desired to project this journal bar forwardly at the rear of the automobile. As indicated in Figs. 3 and 4, there are provided a pair of journal brackets 10 bolted or otherwise rigidly secured to the chassis 11 of the automobile. The bar 9 is preferably square except where it passes through the journal brackets 10 where it is round so as to readily rock. A coupling I-beam frame 12 is secured to the bar 9 near each end by suitable U bolts 13 which preferably straddle the bar 9, as shown in Fig. 4, and extend through the flanges of the I-beam frame 12. The frame 12 is provided with an arc-shaped section 14 and bracing bars 15 and 16, which bracing bars are welded together and also to a circular plate 17, as shown in Fig. 5. One or more rivets 18 are also used so that the parts will be rigidly connected together and also rigidly connected to the pin 19 which is also welded to the frame 12.

From Fig. 4 it will be observed that the frame 12 is inclined downwardly toward the back of the automobile, while the extensions 6 and 7 extend inwardly substantially in a horizontal plane as shown in Figs. 1 and 4. The extreme forward ends of the extension 6 and 7 are connected together by small blocks 20 and 21 which are welded to the respective extensions. A pin 22 (Fig. 4) is threaded into block 21 and is held against movement by a lock nut 23. The opposite end of this pin is provided with a reduced part 24 which is rotatably mounted in a roller 25 as shown in Fig. 6. The reduced extension 23 is appreciably longer than the roller 25 is thick so that normally when the automobile and trailer are stationary it will project beyond the roller, as shown in Fig. 6.

When the automobile 1 is started and strain is put on the coupler, the coupler bars and the extensions 6 and 7 will move slightly to the rear against the action of the pull rod spring 26. This spring loosely surrounds the pull rod 27, which rod is provided with a nut 28 at the free end and which extends loosely through a yoke or cross bar 29, which cross bar has side arms 30 and 31 secured in any suitable manner, as for instance by bolts 32 and 33, to the respective extensions 6 and 7. The forward end of the pull rod 27 is threaded into the block or nut 34, to which block or nut a metal strap 35 is firmly welded. This strap encircles a disk 36 to which it is firmly welded or otherwise rigidly secured. The ring or disk 36 is rotatably mounted on the draw pin 19, which draw pin is provided with a washer and nut 37 to hold the parts together. If desired, instead of having the strap, ring, and parts just described, these parts could be made in one piece and provided with a suitable opening for receiving the forward end of the pull rod 27 and a nut associated therewith. By reason of this construction, when the automobile 1 starts forwardly strain will be transmitted through the journal brackets 10 to bar 9 and from bar 9 to frame 12. The frame 12 will transmit the strain through pin 19 to the ring or disk 36, and this ring will transmit the strain through strap 25 and pull rod 27 to the spring 26. Spring 26 bears against the yoke or cross bar 29 and, consequently, the strain is eventually exerted on the extensions 6 and 7 of the draw bars 4 and 5. Spring 26 as described permits the longitudinal movement of the pull rod and takes up the strain as the automobile pulls the trailer. It will be noted that the pull rod not only slides but may rock with the automobile. In this way a relative twisting movement between the automobile and trailer is readily taken care of.

In providing the spring 26 it must be properly proportioned to yield a certain distance as the limit so that the roller 25 will not move off the member 14. Ordinarily it has been found that the extreme movement of one inch on the pull rod is sufficient though a greater or less movement may be provided by varying the width of the member 14 on which the roller 25 moves. In connection with this roller, under some circumstances the flange 38 is sufficient, but if this flange were omitted when applying the device to certain cars, a nut could be used on the end of the reduced extension 24.

It will be seen that in this way there is a comparatively easy starting for the trailer as the strain is thus distributed through the use of a spring. In case the automobile 1 should stop on an incline or in some other position it will act as a retarding influence instead of a pulling influence and by reason of the incline of frame 12 the roller 25 will remain on the upper surface of the section 14.

It will be noted that an arc-shaped plate 38 is welded or otherwise secured to the frame 12 so as to prevent the accidental movement of the roller 25 forwardly and off the section 14. In Fig. 3 abutments 38 and 39 are provided on section 14 to limit the swinging movement of the extensions 6 and 7. These abutments are bolted in place and suitable apertures are provided in section 14 to form an adjustment of these abutments.

If it should be desired at any time to disconnect the automobile 1 from the trailer 2, it will only be necessary to remove the nut 37 and raise the extensions 6 and 7 upwardly a few inches. The automobile may then be driven off as it is completely disconnected from the coupler. When this takes place, the frame 12 and associated parts will remain on the automobile 1. Also the cover or lid 8 may be lowered to its correct position and no one will notice any of the coupler parts. When it is desired to recouple the trailer with the automobile, the cover 8 is raised slightly and the parts moved to the position shown in Figs. 1 and 3 and ring 36 slipped over pin 19. The washer and nut 37 are then placed in position and if desired a locking wire or pin 37' applied to prevent the nut coming off.

I claim:

1. A coupling for a trailer including a drawbar, a pair of journal brackets adapted to be rigidly secured to an automobile forwardly of the rear end thereof, a rock bar carried by said journal brackets, a frame rigidly secured to said rock bar, said frame and rock bar swinging in a vertical plane when in use, said frame being substantially elliptical in shape with the front presenting an arc-shaped member and the rear a pair of rearwardly converging bars, and means for securing the forward part of said draw-bar to said frame so that the front end will normally rest on said arc-shaped member while the entire draw-bar swings horizontally independently of said frame and vertically with said frame, said means including a pin secured to said converging bar at the point of convergence, an apertured member into which said pin extends, and yielding means connecting said apertured member with said draw-bar.

2. A coupling for a trailer including a drawbar adapted to be rigidly secured to a trailer, a coupler frame adapted to be pivotally mounted on the rear part of an automobile so as to swing in a vertical plane, a draft pin rigidly secured to said frame, a pull rod carried by said draw bar, and means including a ring secured to said pull rod for connecting said draw-bar to said frame, said ring rotatably fitting around said draft pin with the parts positioned so that said draw-bar may swing in a horizontal plane around said draft pin.

3. A coupler for a trailer including a draw-bar secured to a trailer, a coupler frame pivotally connected to an automobile so as to swing in a vertical plane, a draw pin carried by said frame at the end nearest the trailer positioned to stand vertically when in use, a ring rotatably mounted on said pin, a pull rod secured to said ring, a cross bar secured to said draw-bar, said cross bar having an aperture through which said pull rod freely slides, a spring surrounding said pull rod with one end resting against said cross bar, and an abutment adjacent the free end of said pull rod against which the opposite end of said spring rests whereby said draw-bar and said frame may swing relatively to each other in a horizontal plane while strain is being transmitted from the frame to the draw-bar, said pin, said pull rod and said spring being brought under tension before the strain is communicated from the frame to the draw-bar.

WILBUR C. FRY.